United States Patent
Yeo et al.

(10) Patent No.: US 8,689,570 B2
(45) Date of Patent: Apr. 8, 2014

(54) AIR CONDITIONING APPARATUS AND CONTROL METHOD THEREOF

(75) Inventors: Jongseob Yeo, Changwon (KR); Jiwon Lim, Changwon (KR); Juhyun Kim, Changwon (KR)

(73) Assignee: LG Electronics Inc., Seoul (KR)

( * ) Notice: Subject to any disclaimer, the term of this patent is extended or adjusted under 35 U.S.C. 154(b) by 290 days.

(21) Appl. No.: 13/210,438

(22) Filed: Aug. 16, 2011

(65) Prior Publication Data
US 2012/0144848 A1     Jun. 14, 2012

(30) Foreign Application Priority Data
Dec. 13, 2010   (KR) .................... 10-2010-0126676

(51) Int. Cl.
*F25D 3/12*     (2006.01)

(52) U.S. Cl.
USPC .................................. 62/56; 62/125; 62/129

(58) Field of Classification Search
USPC ........... 62/125, 126, 129, 131, 158, 176.6, 56
See application file for complete search history.

(56) References Cited

U.S. PATENT DOCUMENTS

| | | | | |
|---|---|---|---|---|
| 5,544,809 | A * | 8/1996 | Keating et al. .............. | 236/44 C |
| 6,049,274 | A * | 4/2000 | Stachurski .................... | 340/541 |
| 6,109,531 | A * | 8/2000 | Hollis ............................ | 236/10 |
| 6,196,468 | B1 * | 3/2001 | Young ......................... | 236/46 R |
| 6,708,505 | B2 * | 3/2004 | Nakamura et al. ............. | 62/125 |
| 7,270,278 | B2 * | 9/2007 | Street et al. ..................... | 236/51 |
| 7,412,842 | B2 * | 8/2008 | Pham .......................... | 62/228.5 |
| 7,782,199 | B2 * | 8/2010 | Issokson ....................... | 340/541 |
| 8,234,017 | B2 * | 7/2012 | Ahn .............................. | 700/295 |
| 2003/0033392 | A1 * | 2/2003 | Nakamura et al. ............ | 709/221 |
| 2006/0197745 | A1 * | 9/2006 | Yokozawa .................... | 345/158 |

FOREIGN PATENT DOCUMENTS

| | | |
|---|---|---|
| JP | 2003-111171 | 4/2003 |
| JP | 2008-281241 | 11/2008 |
| KR | 10-2003-0011219 | 2/2003 |

OTHER PUBLICATIONS

Korean Office Action dated Aug. 7, 2012.

* cited by examiner

*Primary Examiner* — Mohammad M Ali
(74) *Attorney, Agent, or Firm* — KED & Associates LLP

(57) ABSTRACT

An air conditioning apparatus is provided that includes an indoor device including a heat exchanger, and a remote controller to input an operation condition of the indoor device. The remote controller includes a sensor that senses a moving state of the remote controller, a controller that determines the operation condition of the indoor device based on a result sensed by the sensor, and a signal transmitting and receiving device that transmits and receives a signal to and from the indoor device. The indoor device includes a blower, a wind direction controller that controls a discharge direction of air discharged from the blower, a signal transmitting and receiving device that transmits and receives a signal to and from the remote controller, and a controller that controls the driving of the blower and the wind direction controller in accordance with the operation condition received from the remote controller.

20 Claims, 5 Drawing Sheets

AIR CONDITIONING APPARATUS AND CONTROL METHOD THEREOF

CROSS-REFERENCES RELATED APPLICATIONS

The present application claims the benefits of priority to Korean Patent Application No. 10-2010-0126676 (filed on Dec. 13, 2010), which is herein incorporated by reference in its entirety.

THE BACKGROUND

1. The Field

The present invention relates to an air conditioning apparatus and a control method thereof.

2. Description of the Related Art

An air conditioning apparatus controls indoor air to be maintained in a cooling or heating state through heat exchange between the indoor air and refrigerants through a cooling cycle operation.

The air conditioning apparatus installed indoor can be largely classified into a wall hanging type, a standing type, and a ceiling buried type. In addition, an operation mode of most air conditioning apparatuses that have been released in recent years, in particular, an indoor unit can be set up through a remote controller. That is, operation commands related to a wind direction and a wind velocity, and an indoor temperature and an indoor humidity can be inputted through various control buttons provided in the remote controller and the operation commands are transmitted to the air conditioning apparatus through infrared signal transmitting and receiving portions provided in the remote controller.

The remote controller in the related art includes an additional button for controlling the wind direction and an additional button for controlling the wind velocity and a user pushes the buttons to set a desired wind direction or a wind velocity.

THE SUMMARY

In recent years, a consumer's demand for an air conditioning apparatus that allows a user to input a command even through simple control of a remote controller itself without pushing a button for inputting an additional condition in order to control a wind direction or a wind velocity has been increased.

In particular, a necessity for the air conditioning apparatus that allows the user to input a command only by swinging a remote controller is on the rise in the situation that it is not easy to input a wind direction or a wind velocity through the remote controller while an interior lamp is not turned on at night.

The present invention has been made in an effort to provide an air conditioning apparatus with a remote controller capable of more easily inputting an operation control of the air conditioning apparatus and a control method thereof.

An exemplary embodiment of the present invention provides an air conditioning apparatus including: an indoor unit with a heat exchanger; and a remote controller for inputting an operation condition of the indoor, wherein the remote controller includes a sensor sensing a moving state of the remote controller; a control unit determining the operation condition of the indoor unit based on a result sensed by the sensor; and a signal transmitting and receiving unit transmitting and receiving a signal to and from the indoor unit, and the indoor unit includes a blowing unit; a wind direction control unit controlling a discharge direction of air discharged from the blowing unit; a signal transmitting and receiving unit transmitting and receiving a signal to and from the remote controller; and a control unit controlling the driving of the blowing unit and/or the wind direction control unit in accordance with the operation condition received from the remote controller.

Further, another exemplary embodiment of the present invention provides a control method of an air conditioning apparatus including an indoor unit and a remote controller for inputting a driving command of the indoor unit, the method including: starting a motion control function; sensing, by a sensor incorporated in the remote controller, a moving state of the remote controller; selecting an operation condition of the indoor unit in accordance with a result sensed by the sensor; transmitting the operation condition to the indoor unit; and driving the indoor unit in accordance with the transmitted operation condition.

According to an air conditioning apparatus and a control method thereof according to exemplary embodiments of the present invention, a user can change a wind direction or a wind velocity of the air conditioner by only swinging a remote controller horizontally or vertically without finding and pushing an additional button in order to change the wind direction or the wind velocity.

Accordingly, since the user can easily control an operation of the air conditioner, use convenience is improved.

THE DETAILED DESCRIPTION

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Hereinafter, an air conditioning apparatus and a control method thereof according to exemplary embodiments of the present invention will be described in detail with reference to the accompanying drawings.

Figure 1:
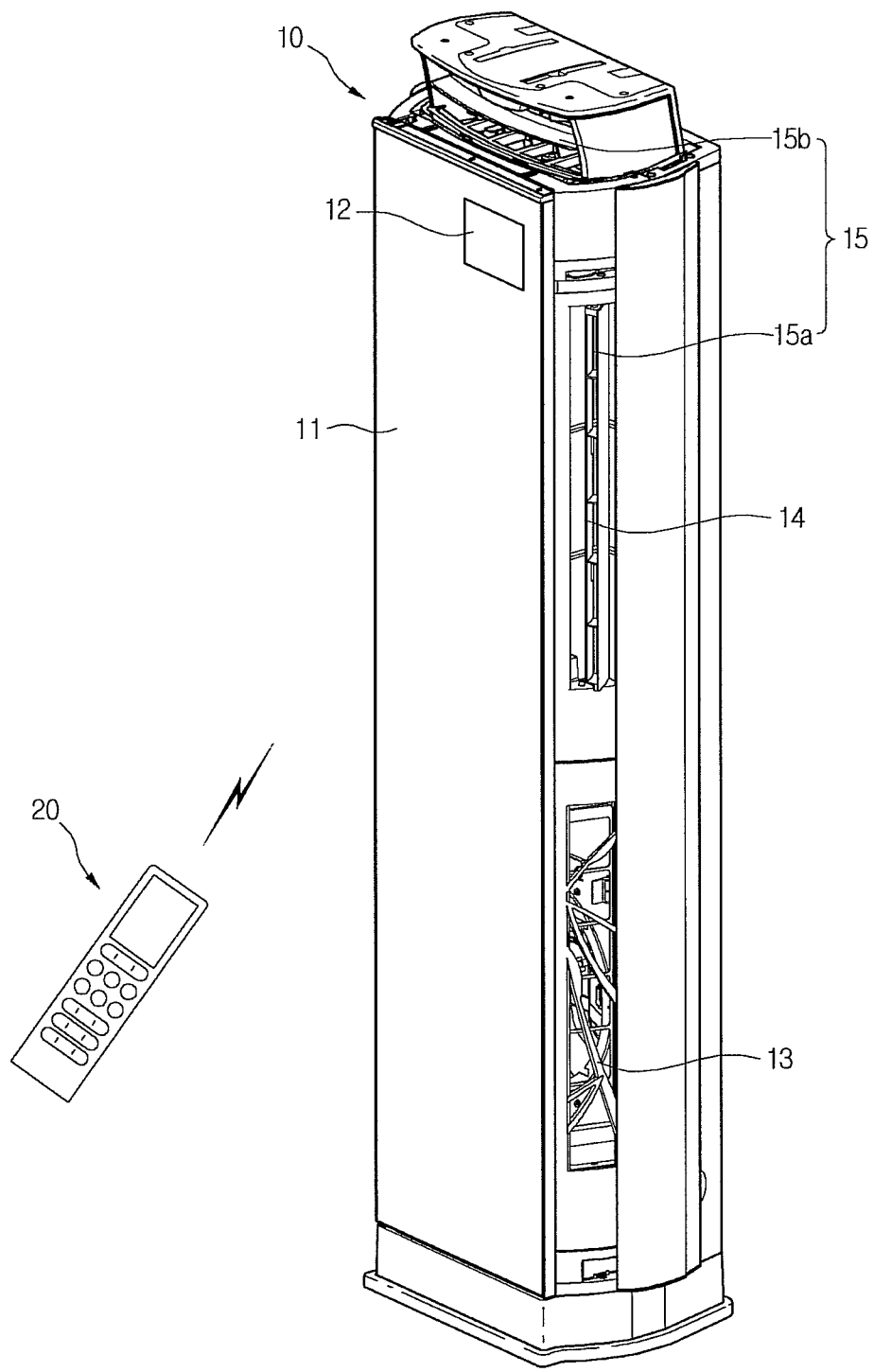
FIG. 1 is a perspective view showing an air conditioning apparatus and a remote controller according to an exemplary embodiment of the present invention.
Figure 2:
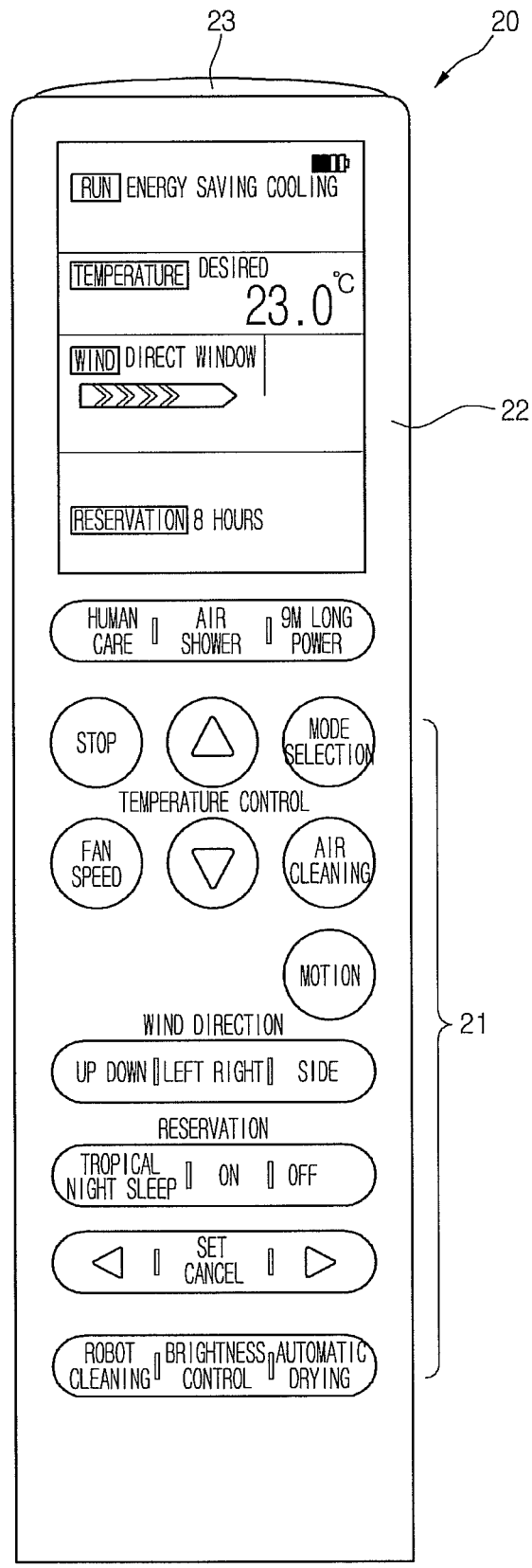
FIG. 2 is a perspective view showing a remote controller for controlling an operation of an air conditioning apparatus according to an exemplary embodiment of the present invention.

FIG. 1 is a perspective view showing an air conditioning apparatus and a remote controller according to an exemplary embodiment of the present invention and FIG. 2 is a perspective view showing a remote controller for controlling an operation of an air conditioning apparatus according to an exemplary embodiment of the present invention.

Referring to FIG. 1, an indoor unit 10 of an air conditioning apparatus according to an exemplary embodiment of the present invention includes a main body 11, a display window 12 provided on a front surface of the main body 11 and showing an operation state and/or an indoor temperature, and a suction hole 13 and a discharge hole 14 provided at one side of the main body 11.

Specifically, the discharge hole 14 may be provided on the side or the top of the indoor unit 10. In addition, a discharge vein 15a controlling a horizontal discharge direction of cooled air discharged to the discharge hole 14. Further, according to products, when an air conditioning operation starts, a pop-up discharge portion 15b that slides up to the upper side of the main body 11 may be further provided. In addition, a vein for controlling a horizontal discharge direction of the cooled air may be provided in the pop-up discharge portion 15b.

Referring to FIG. 2, a display window 22 displaying an operation state, indoor temperature/humidity, and a time is provided a remote controller 20 according to an exemplary embodiment of the present invention. In addition, an on/off button turning on/off a power supply of the indoor unit 10 and an input button 21 for inputting operation conditions related to an operation condition, a wind direction, a wind velocity, and the like are provided in the lower side of the display window 22.

Further, in the remote controller 20, a motion control button that can input a wind direction or wind velocity condition by swinging the remote controller 20 horizontally or vertically may be provided. In addition, the motion control button may be additionally provided at any one side of a region of the input button 21. Light emitting units are additionally provided on rear surfaces of the on/off button and the motion control button can be verified with naked eyes even at night without light.

Further, a wireless signal for an operation command is transmitted to the front surface of the remote controller 20 and an infrared sensor 23 for receiving information from the indoor unit 10 may be provided. In addition, a sensing unit (to be described below) sensing whether the user grips the remote controller 20 with a hand may be provided on the outer periphery of the remote controller 20. Therefore, when the user grips the remote controller 20 with the hand, light may be turned in the display window 22 or light may be turned on in the input button 21. Light is turned on in the at least on/off button and the motion control button and the user can easily control the indoor unit 10 even at night.

Figure 3:
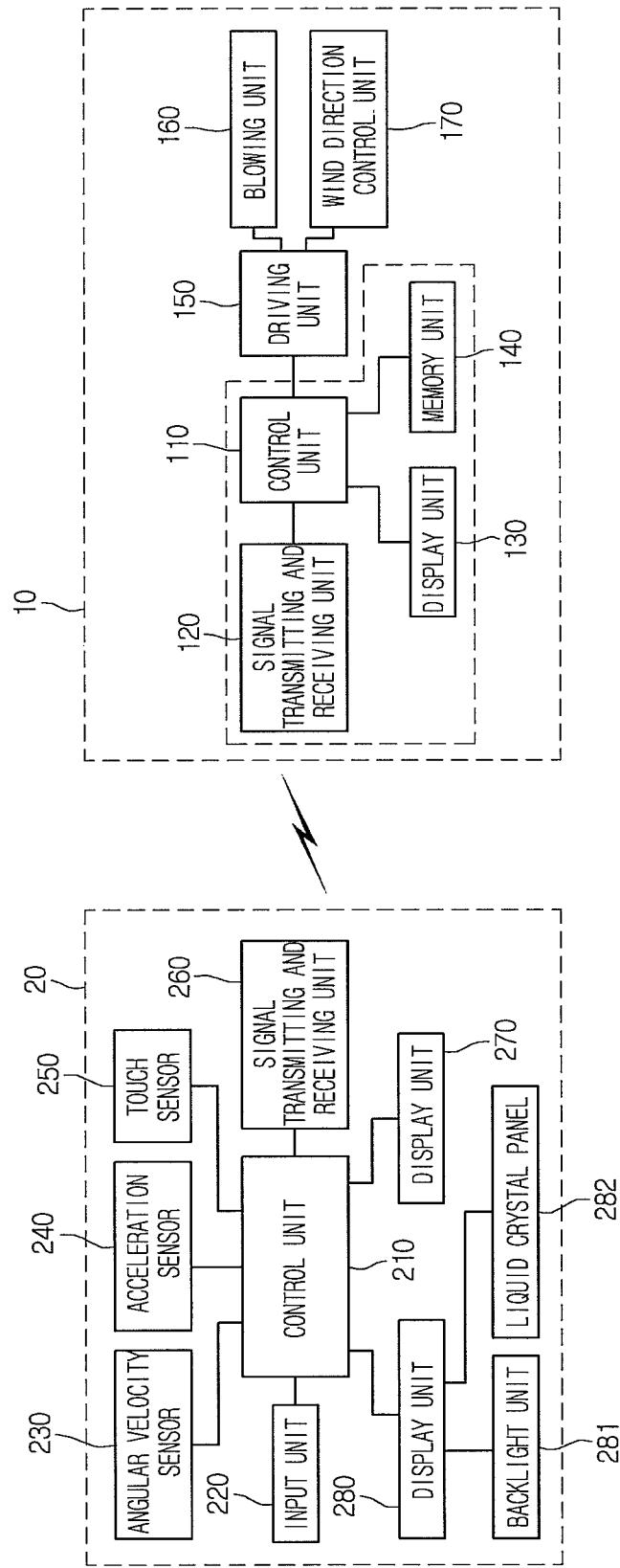
FIG. 3 is a block diagram schematically showing a control configuration of an air conditioning apparatus and a remote controller according to an exemplary embodiment of the present invention.

FIG. 3 is a block diagram schematically showing a control configuration of an air conditioning apparatus and a remote controller according to an exemplary embodiment of the present invention.

Referring to FIG. 3, the indoor unit 10 according to an exemplary embodiment of the present invention may include a control unit 110, a signal transmitting and receiving unit 120 electrically connected to the control unit 110 and transmitting and receiving the wireless signal from the remote controller 20, a display unit 130 displaying the operation state and indoor temperature/humidity, a memory 140 storing information and various data transmitted from the signal transmitting and receiving unit 120, and a driving unit 150 controlling operations of a blowing unit 160 and a wind direction control unit 170.

Specifically, the signal transmitting and receiving unit 120, the control unit, and the memory unit 140 may be provided on a rear surface of the display unit 130 in a form of a PCB with chips attached thereto. That is, the signal transmitting and receiving unit 120, the control unit 110, and the memory 140 are installed on the rear surface of the display unit 130 in one module form and may be electrically connected with the display unit 130.

Further, the display unit 130 may be provided as the form of the display window 12 described in FIG. 1 and in the exemplary embodiment, the display unit 130 is defined as the same configuration as the display window 12.

In addition, the wind direction control unit 170 includes a wind direction control device 15 described in FIG. 1 and may include a vein or a louver varying the horizontal or vertical direction of the discharged cooled air. Further, the driving unit 150 may include a motor driver for driving the blowing unit 160 or the wind direction control unit 170.

Meanwhile, the remote controller 20 includes a control unit 210, an input unit 220 for inputting the operation condition of the indoor unit 10, a display unit 280 displaying the operation state and/or indoor temperature/humidity of the indoor unit 10, a memory 270 storing various data and information received from the input unit 220 or the indoor unit 10, and a signal transmitting and receiving unit 260 for wirelessly communicating with the indoor unit 10 and the signal transmitting and receiving unit 120.

Further, the remote controller 20 further includes an angular velocity sensor 230 and an acceleration sensor 240 sensing a motion of the remote controller 20, that is, vertical-direction or horizontal-direction swinging, and a touch sensor 250 sensing whether or not to grip the remote controller 20 therein.

In detail, the display unit 280 may include the display window 22 described in FIG. 2 and specifically, may include a liquid crystal panel 281 on which characters or figures are displayed and a backlight unit 282 providing light in the rear part of the liquid crystal panel 281. In addition, the backlight unit 282 may be selectively turned on/off depending on a result sensed by the touch sensor 250 in addition to control of the input unit 220.

Meanwhile, the input unit 220 may be provided in the form of the input button 21 described in FIG. 2 and the signal transmitting and receiving unit 260 may include the infrared sensor 23 described in FIG. 2. However, the infrared sensor 23 is not limited and all sensors that are communicatable wirelessly, such as Bluetooth or ZigBee can be applied.

Further, the touch sensor 250 may includes a capacitance sensor sensing variation of capacitance generated when the user grips the remote controller 20 or a pressure sensor sensing force with which the user grips the remote controller 20.

In addition, the angular velocity sensor 230 as a sensor sensing horizontal rotation or vertical rotation of the remote controller 20 may include a gyro sensor or a gravity sensor. The acceleration sensor 240 as a sensor sensing a velocity in a movement direction of the remote controller 20 senses the intensity of the motion of the remote controller 20.

Operations of the indoor unit 10 and the remote controller configured as above will be described.

First, the user pushes the motion control button provided in the remote controller 20 to allow a motion control function to be performed. When the motion control button is pushed, the operations of the angular velocity sensor 230 and the acceleration sensor 240 are initialized and the angular velocity sensor 230 and the acceleration sensor 240 prepare for sensing an operational state of the remote controller 20. Herein, at the moment when the user grips the remote controller 20, the touch sensor 250 reacts to the gripping to turn on the backlight unit 282. For example, when the user grips the remote controller 20 with the hand, the backlight unit 282 is turned on to emit light soft light from the remote controller through the display unit 280. Of course, soft light may be leaked from on the periphery of the on/off button or the motion control button.

In this state, the user swings the remote controller 20 to set a desired operation condition and transmit the desired operation condition to the indoor unit 10.

Specifically, the user swings the remote controller 20 horizontally or vertically to allow the sensors 230 and 240 to sense the motion of the remote controller 20 and the sensing result to be transmitted to the control unit 210. In addition, the control unit 210 downloads look-up table type table data from the memory 270 and compares the table data with the sensing result transmitted from the sensors 230 and 240 to judge which type operation condition is set. The table data may be data in which a wind direction condition and a wind velocity (air volume) condition depending on the rotational direction of the remote controller 20 match each other.

Meanwhile, when the control unit 210 analyzes the operation condition, the analyzed result is converted to a control signal and the converted signal is transmitted to the signal transmitting and receiving unit 120 of the indoor unit 10 through the signal transmitting and receiving unit 260. Thereafter, the transmitted control signal is transmitted to the control unit 110 of the indoor unit 10 and analyzed by the control unit 110, which transmits the corresponding operation control command to the driving unit 150. Then, the control unit 110 controls the driving of the blowing unit 160 and/or the wind direction control unit 170 according to the received control signal. That is, the control unit controls the driving motor to operate according to a rotational velocity of the blowing unit 160 or a rotational angle of the wind direction control unit 170.

Figure 4:
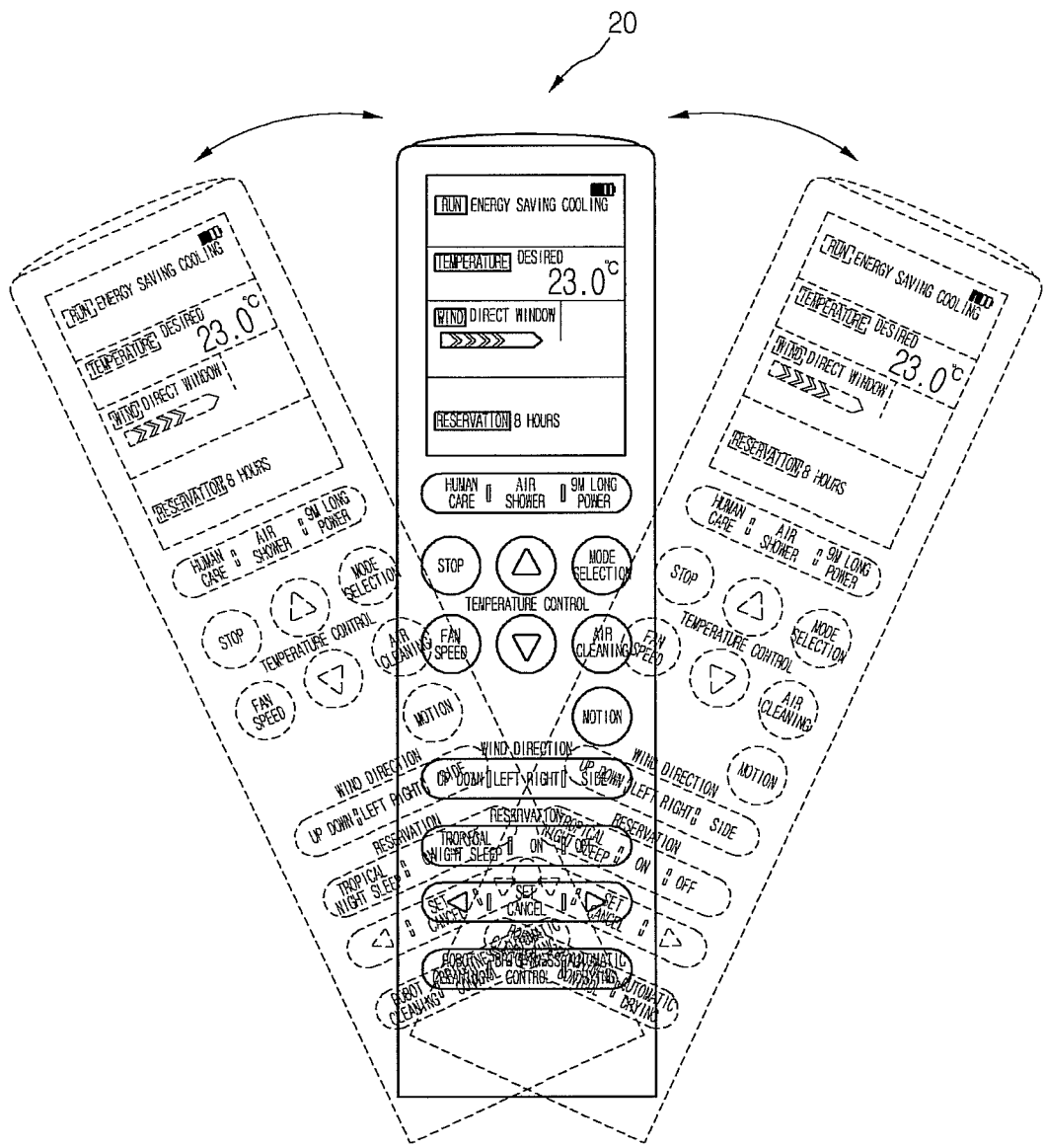
FIGS. 4 and 5 are diagrams showing a control state of a remote controller for controlling an operation of an air conditioning apparatus according to an exemplary embodiment of the present invention.
Figure 5:
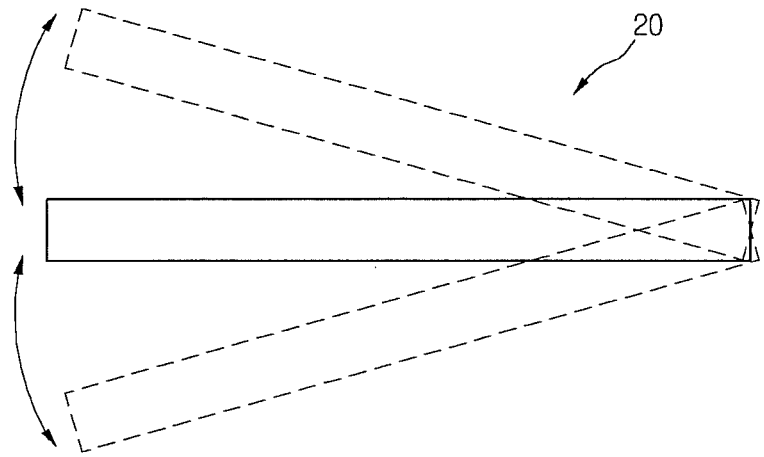

FIGS. 4 and 5 are diagrams showing a control state of a remote controller for controlling an operation of an air conditioning apparatus according to an exemplary embodiment of the present invention.

Referring to FIG. 4, the user may swing the remote controller 20 leftward or rightward with the remote controller gripped with the hand. Therefore, the angular velocity sensor 240 incorporated in the remote controller 20 senses the rotational direction of the remote controller 20 to sense the rotational velocity or the rotational angle. In addition, the result sensed by the angular velocity sensor 230 is transmitted to the control unit 210 of the remote controller 20.

Specifically, the control unit calls a "look-up table in which a wind direction/wind velocity corresponding to the rotational angle/velocity" stored in the memory 270. In addition, by the look-up table with the result transmitted from the angular velocity sensor 230, the control unit 210 selects the wind direction angle/air volume (wind velocity) corresponding to the transmitted rotational angle/velocity. Further, the selected operation condition is converted into a wireless signal and thus transmitted to the signal transmitting and receiving unit 260. In addition, the wireless signal is transmitted from the signal transmitting and receiving unit 260. Thereafter, the signal transmitting and receiving unit 120 of the indoor unit 10 receives the wireless signal transmitted form the signal transmitting and receiving unit 260 of the remote controller 20 and transmits the received wireless signal to the control unit 110. In addition, the control unit 110 of the indoor unit 10 analyzes the received operation condition, and converts the analyzed result into an electrical signal and transmits the electrical signal to the driving unit 150. Further, the velocity of the blowing unit 160 and/or the rotational angle of the wind direction control unit 170 are changed by the driving unit 150, such that the operational state is changed.

Referring to FIG. 5, the user may rotate the remote controller 20 vertically. Similarly as described in FIG. 4, when the user swings the remote controller 20 upward or downward, the angular velocity sensor 230 senses the rotational direction of the remote controller 20 and the acceleration sensor 240 senses the rotational velocity of the remote controller 20. In addition, the sensed result is transmitted to the control unit 210 and a predetermined operation condition is set by comparing the transmitted sensing result with the look-up table in which the operation conditions depending on the vertical rotation of the remote controller are matched with each other.

Specifically, the set operation condition is transmitted to the signal transmitting and receiving unit 120 of the indoor unit 10 through the signal transmitting and receiving unit 260 and the subsequent processes follow the above-mentioned same control flow.

Herein, the operation of swinging the remote controller 20 leftward or rightward may be set as the control for change the wind direction and set as the control for changing both the wind direction and the wind velocity. For example, when the remote controller 20 is swung leftward, the wind direction control unit 170 rotates leftward to allow a left concentration wind operation to be performed. In addition, the rotational angle of the wind direction control unit 170 may be accumulated and changed to a uniform angle according to the number of swinging times of the remote controller 20. For example, whenever the remote controller 20 is swung once leftward or rightward, the rotational angle of the wind direction control unit 170 may be programmed to be changed by each 5 degrees. Alternatively, the rotational angle of the wind direction control unit 170 may be programmed to be determined according to the rotational angle of the remote controller 20. For example, when the rotational angle of the remote controller 20 is within 20 degrees, the rotational angle of the wind direction control unit 170 is changed by 5 degrees and when the rotational angle of the remote controller 20 is within the range of 20 to 45 degrees, the rotational angle of the wind direction control unit 170 may be changed by 10 degrees. That is, the look-up table may be configured so that the rotational angle of the wind direction control unit 170 varies depending on the rotational angle of the remote controller 20 sensed by the angular velocity sensor 230.

As another method, it may be programmed so that as the rotational angle of the wind direction control unit 170 increases, the air volume, i.e., the velocity of the blowing unit 160 also increases according to a predetermined rule. For example, whenever the wind direction control unit 170 is changed by 5 degrees, the rotational velocity of the blowing unit 160 increases by each 10% as compared with the rotational velocity of the blowing unit 160 or the rotational velocity of the blowing unit 160 depending on the rotational angle of the wind direction control unit 170 may be fixed as the look-up table type.

Meanwhile, the operation of swinging the remote controller 20 vertically may be set as the control for changing the air volume (wind velocity). For example, a control program may be set so that when the remote controller 20 rotates upward, the air volume increases and when the remote controller 20 rotates downward, the air volume decreases.

As another method, the operation of swinging the remote controller 20 vertically may be set as the control for changing the vertical wind direction. That is, the horizontal or vertical rotation of the remote controller 20 is defined as the control for changing the air volume and the air volume (wind velocity) may be changed by using an additional button or performing other type controls of the remote controller 20. Herein, by other type control of the remote controller, i.e., swinging the remote controller 20 horizontally, the acceleration sensor 240 may sense the velocity of the remote controller 20.

Table 1 shows an example of an operation condition lookup table stored in the memory of the remote controller according to an exemplary embodiment of the present invention.

Referring to Table 1, it can be verified how the operation condition of the indoor unit 10 is set according to the vertical or horizontal operation of the remote controller and how the operation condition is displayed in the display unit 280 of the remote controller 20.

For example, when the remote controller 20 is swung upward and thereafter, restored to an original position with being gripped with the hand, the angular velocity sensor 230 senses that the remote controller 20 rotates upward and a long power wind mode is set according to the sensing result, and a long power wind is displayed by characters or figures. The long power wind as an operation condition (mode) in which a wind goes far from the indoor unit 10 allows the velocity of the blowing unit 160 to be increased while the wind direction control unit 170 rotates upward.

As another example, when the remote controller 20 rotates downward, an operation condition called a speed shower may be set. The speed shower may be defined as an operation mode in which the wind concentrates on a predetermined position and the air volume of a fan increases to cool the predetermined position in a short time.

Further, as shown in Table 1, the leftward or rightward rotation of the remote controller 20 may be defined as the increase or decrease of the air volume (wind velocity). That is, the wind velocity increases or decreases depending on the rotation of the remote controller 20 or the wind velocity may be displayed as numeral values in the display unit 280.

TABLE 1

| Control direction | Functions | Display unit |
| --- | --- | --- |
| Up | Long power wind | Long power wind |
| Down | Speed shower | Speed shower |
| Left | Increase of wind velocity | 00 m/s |
| Right | Decrease of wind velocity | 00 m/s |

Table 2 shows an example of an operation condition lookup table stored in the memory of the remote controller according to another exemplary embodiment of the present invention.

Referring to Table 2, the operation condition when the remote controller 20 is swung vertically is the same as the exemplary embodiment presented in Table 1, however, the operation condition when the remote controller 20 is swung horizontally in Table 2 is different from that in Table 1.

Specifically, when the remote controller 20 is swung leftward, a left concentration wind operation mode may be set and when the remote controller 20 is swung rightward, a right concentration wind operation mode may be set. Herein, the rotational angle of the wind direction control unit 170 for the left concentration wind or the right concentration wind may be set depending on the number of rotation times of the remote controller 20 or set depending on the rotational angle. Since this has been already described as above, a more detailed description thereof will be omitted. In addition, a wind-direction angle may be displayed in the display unit 280 as numerical values.

TABLE 2

| Control direction | Functions | Display unit |
| --- | --- | --- |
| Up | Long power wind | Long power wind |
| Down | Speed shower | Speed shower |
| Left | Left concentration wind | 00° left concentration wind |
| Right | Right concentration wind | 00° right concentration wind |

Figure 6:
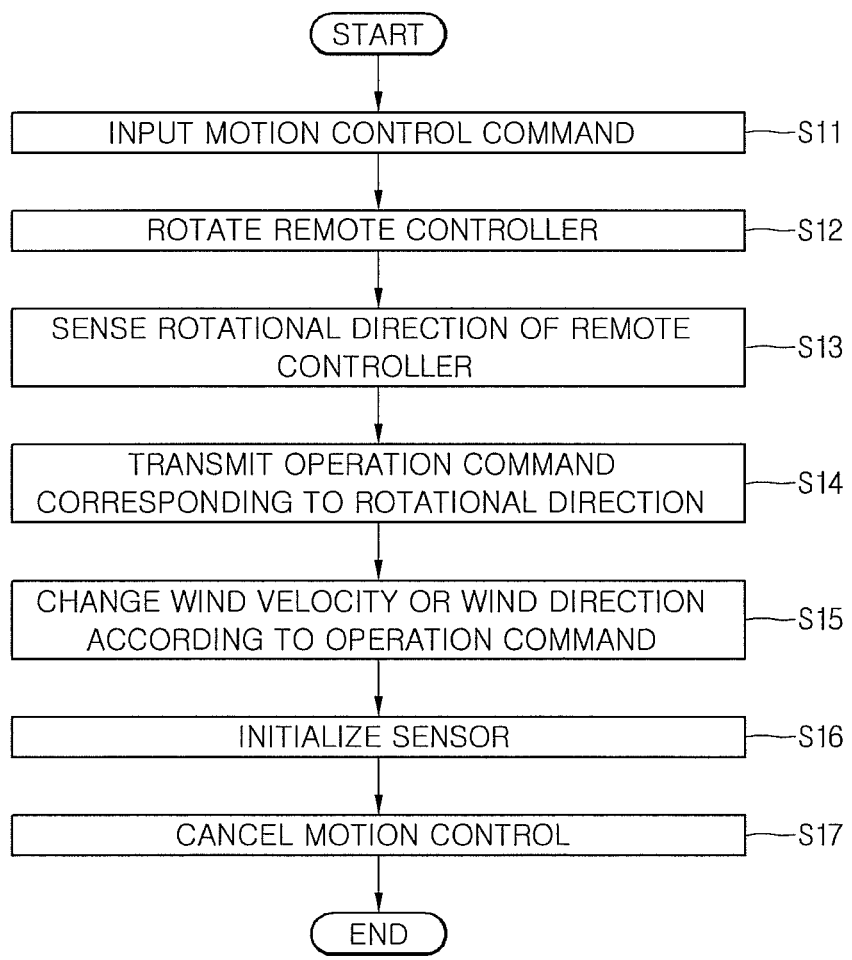
FIG. 6 is a flowchart showing a motion control algorithm according to an exemplary embodiment of the present invention.

FIG. 6 is a flowchart showing a motion control algorithm according to an exemplary embodiment of the present invention.

Referring to FIG. 6, a user pushes a motion control command button provided in a remote controller 20 to input a motion control command (S11). Thereafter, the remote controller is swung in a predetermined direction (S12). Therefore, an angular velocity sensor 230 and/or an acceleration sensor 240 sense a rotational direction and a rotational velocity of the remote controller 20 (S13).

In addition, the sensed rotational direction and rotational velocity are transmitted to a control unit 210 of the remote controller 20 and an operation condition corresponding to a transmitted sensing result is selected. Further, the selected operation condition is transmitted to the indoor unit 10 through a signal transmitting and receiving unit 260 (S14). In addition, a control unit 110 of an indoor unit 10 transmits an electrical signal corresponding to the transmitted operation condition to the driving unit 150 and allows an air volume (wind velocity) and/or a wind direction to be changed according to an operation command (S15).

Herein, when a predetermined time elapsed after the angular velocity sensor 230 and the acceleration sensor 240 sense the rotation of the remote controller 20, the angular velocity sensor 230 and the acceleration sensor 240 are automatically initialized to prepare for sensing a next operation of the remote controller 20 (S16).

Further, when a predetermined time elapsed after last rotation of the remote controller 20 or a user controls the motion control button, a motion control function is cancelled (S17).

Specifically, it may be programmed so that when the predetermined time elapsed after the last rotation of the remote controller 20, the motion control function is cancelled. As another method, when the user pushes the motion control button once more, a motion control cancellation command may be inputted.

Meanwhile, a smart meter (not shown) that calculates electrical charges by sensing electric power may be installed in a home where the indoor unit 10 is installed. The user may set a peak electrical power value through the smart meter and when the electrical power supplied to the home is equal to or more than the set peak electrical power value, an operation of a predetermined home appliance may be restricted. For example, when it is judged that the electrical power of the peak electrical power value is used, a standby electrical power may be sequentially interrupted by giving a priority to a predetermined home appliance or supplying of electricity to a predetermined home appliance may be interrupted.

In the exemplary embodiment of the present invention, the control methods may be mixed and as the method, the smart meter may be coupled to a control algorithm of the indoor unit 10. In other words, the smart meter and the control unit 110 of the indoor unit 10 are connected to each other in a wired or wireless method to thereby transmit a result value calculated by the smart meter to the control unit 110 of the indoor unit 10. In addition, the control unit 110 of the indoor unit 10 combines data transmitted from the smart meter and an operation condition through motion control transmitted from the remote controller 20 so as to appropriately control an operation of the indoor unit 10.

For example, the operation may be controlled by giving the priority to the operation condition transmitted from the remote controller 20 and the operation condition depending on the data value transmitted from the smart meter. The user may set the peak electrical value through the smart meter and previously set the operation condition of the indoor unit 10 depending on the peak electrical value through an input unit 120 of the indoor unit 10. In addition, when it is judged that the electrical power value sensed through the smart meter reaches the peak electrical value, the operation condition of the indoor unit depending on the peak electrical value may be executed preferentially over the operation condition inputted through the remote controller. That is, the operation control through the motion control of the remote controller may be intrinsically interrupted while the sensed electrical power reaches the peak electrical power.

As another method, only the air volume condition among the operation control conditions through the motion control of the remote controller may be restricted. That is, the wind direction condition is just performed among the operation control conditions through the motion control of the remote controller and as the air volume condition, an air volume condition set depending on the peak electrical power value may be performed. Therefore, the electrical power supplied to a fan of the indoor unit 10 decreases, such that electrical power of an amount smaller than the peak value may be supplied to the home.

What is claimed is:

1. An air conditioning apparatus, comprising:
    an indoor device including a heat exchanger; and
    a remote controller through which an operation condition of the indoor device is input, wherein the remote controller includes:
        a first sensor that senses a moving state of the remote controller;
        a first controller that determines the operation condition of the indoor device based on a result sensed by the first sensor;
        a display that shows at least an operation state of the indoor device;
        a second sensor that senses whether a user grips the remote controller;
        a lighting device that radiates light to the display when the user grips the remote controller; and
        a first signal transmitting and receiving device that transmits and receives a signal to and from the indoor unit device, and wherein the indoor device includes:
        a blower;
        a wind direction controller that controls a discharge direction of air discharged from the blower;
        a second signal transmitting and receiving device that transmits and receives a signal to and from the remote controller; and
        a second controller that controls driving of the blower and the wind direction controller in accordance with the operation condition received from the remote controller.

2. The air conditioning apparatus of claim 1, wherein the moving state of the remote controller includes at least one of or both a horizontal rotation and a vertical rotation of the remote controller.

3. The air conditioning apparatus of claim 1, wherein the first sensor includes at least one of an angular velocity sensor or an acceleration sensor that senses a horizontal rotation or a vertical rotation of the remote controller.

4. The air conditioning apparatus of claim 1, wherein the remote controller further includes:
    an input through which a motion control function to change the operation condition of the indoor device in accordance with the moving state of the remote controller is selected.

5. The air conditioning apparatus of claim 1, wherein the second sensor includes one of a capacitance sensor or a pressure sensor.

6. The air conditioning apparatus of claim 1, wherein the first and second signal transmitting and receiving devices each includes one of infrared communication, Bluetooth, or ZigBee.

7. The air conditioning apparatus of claim 1, further comprising a smart meter that senses electrical power supplied to a home in which the indoor device is installed, wherein the smart meter is connected to communicate with the second controller of the indoor device using a wireless or wired method.

8. A control method for an air conditioning apparatus including an indoor device and a remote controller to input a driving command of the indoor device, the control method comprising:
    starting a motion control function;
    sensing, by a sensor incorporated in the remote controller, a moving state of the remote controller;
    selecting an operation condition of the indoor device in accordance with a result sensed by the sensor;
    transmitting the operation condition to the indoor device; and
    driving the indoor device in accordance with the transmitted operation condition, wherein the motion control function is cancelled when a predetermined time elapses after the sensor senses the moving state of the remote controller or when a cancellation command is input through an input provided in the remote controller.

9. The control method of the air conditioning apparatus of claim 8, wherein the moving state of the remote controller sensed by the sensor includes a rotational angle or a rotational velocity of the remote controller in a predetermined direction.

10. The control method of the air conditioning apparatus of claim 9, wherein one of or both a wind direction or a wind velocity are changed in accordance with a rotational direction of the remote controller.

11. The control method of the air conditioning apparatus of claim 9, wherein a rotational angle of a wind direction control device provided in the indoor device or a rotational velocity of a fan provided in the indoor device is changed in accordance with a rotational direction of the remote controller.

12. The control method of the air conditioning apparatus of claim 8, wherein the starting of the motion control function is performed by inputting a motion control command through the input provided in the remote controller.

13. The control method of the air conditioning apparatus of claim 8, wherein light is radiated from a rear part of a display of the remote controller when a user grips the remote controller.

14. The control method of the air conditioning apparatus of claim 8, wherein the sensor is automatically initialized when a predetermined time elapses after the sensor senses the moving state of the remote controller.

15. The control method of the air conditioning apparatus of claim 8, further comprising sensing, by a smart meter that senses electrical power supplied to a home in which the indoor device is installed, the electrical power supplied indoor.

16. The control method of the air conditioning apparatus of claim 15, wherein when it is judged that a power consumption sensed by the smart meter reaches a peak value, the operation of the indoor device through the motion control function is configured to be restricted.

17. The control method of the air conditioning apparatus of claim 16, wherein the motion control function is configured to be interrupted by the operational restriction of the indoor device.

18. The control method of the air conditioning apparatus of claim 16, wherein the operation condition of the indoor device corresponding to the time when the power consumption reaches the peak value is previously set, and wherein the previously set operation condition of the indoor device is configured to be performed preferentially over the operation condition through the motion control function.

19. The control method of the air conditioning apparatus of claim 16, wherein an air volume of the indoor device corresponding to the time when the power consumption reaches the peak value is previously set, and wherein an air volume condition among the operation conditions input through the motion control function is configured to be substituted by the previously set air volume when the power consumption reaches the peak value.

20. An air conditioning apparatus, comprising:
an indoor device including a heat exchanger; and
a remote controller through which an operation condition of the indoor device is input, wherein the remote controller includes:
   a sensor that senses a moving state of the remote controller;
   a first controller that determines the operation condition of the indoor device based on a result sensed by the sensor;
   a first signal transmitting and receiving device that transmits and receives a signal to and from the indoor device, wherein the indoor device includes:
   a blower;
   a wind direction controller that controls a discharge direction of air discharged from the blower;
   a second signal transmitting and receiving device that transmits and receives the signal to and from the remote controller; and
   a second controller that controls driving of the blower and the wind direction controller, wherein the second controller increases a velocity of the blower and rotates the wind direction controller upward when the remote controller is swung upward and thereafter, restored to an original position, and wherein the second controller increases the velocity of the blower for a preset time interval and rotates the wind direction controller in a pre-determined direction when the remote controller is swung downward.

* * * * *